UNITED STATES PATENT OFFICE 2,330,474

PROCESS FOR BREAKING PETROLEUM EMULSIONS

Melvin De Groote, University City, Mo., assignor to Petrolite Corporation, Ltd., Wilmington, Del., a corporation of Delaware No Drawing. Substituted for abandoned application Serial No. 399,731, June 25, 1941. This application December 14, 1942, Serial No. 468,999

1 Claim. (Cl. 252—331)

This invention relates primarily to the treatment of emulsions of mineral oil and water, such as petroleum emulsions, for the purpose of separating the oil from the water, the present application being a substitute or a re-file for former application Serial No. 399,731, filed June 25, 1941.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude petroleum and relatively soft waters or weak brines. Controlled emulsification and subsequent demulsification, under the conditions just mentioned, is of significant value in removing impurities, particularly inorganic salts, from pipeline oil.

The demulsifier or demulsifying agent employed in my process consists of a water-soluble, surface-active polyglycol ether compound derived by reacting an alkylene oxide with a suitable reactant of the kind subsequently described so as to obtain a material of the kind exemplified, for example, by di(polyethylene glycoxy)decane.

It is well known that various hydroxy hydrocarbon compounds, for instance, long chain alcohols, hydroxylated alicyclic compounds, phenol, and the like, can be treated with materials such as ethylene oxide, propylene oxide, butylene oxide, amylene oxide, glycid, epichlorhydrin, and the like, to produce glycol ethers. For purposes of convenience, reference to an alkylene oxide is intended to mean the type commonly referred to as an alpha-beta alkylene oxide, i. e., where an oxygen atom represents a linkage between two adjacent carbon atoms. Functional equivalents include glycid, epichlorhydrin, or the like. The introduction of the polymerized alkylene oxide chain or recurring ether linkage converts various water-insoluble hydroxy hydrocarbons of the kind described into a water-soluble product.

Oxyalkylation of water-insoluble hydroxy hydrocarbons of the kind previously referred to, in order to render the same water-soluble, or more particularly, in order to render them surface-active, is a well known procedure. An alkylene oxide such as ethylene oxide, may be added in gaseous or liquid phase, to the liquid or melted phenolic body of the kind described, at a temperature at which the alkylene oxide is absorbed. Such temperature may vary, for example, from 50° to 250° C. The gauge pressure may vary from 50 lbs. to 300 lbs., or, in some instances, even to 1,000 pounds. In these reactions the length of the polyglycol ether chain is determined by the proportion of alkylene oxide caused to react.

Such oxyalkylated products, including not only those derived from hydroxylated hydrocarbons, but also those derived from carboxy acids and from primary and secondary amines, are of distinct value in the treatment of oil field emulsions. The present process is characterized by the fact that I have discovered that a very narrow specific class of a certain type of alkanes containing the recurring ether linkage derived from ethylene oxide or the like, yields an unusually effective demulsifying agent. This particular narrow class or species or sub-species, is markedly more effective and more valuable as a demulsifier than the members of the broad class or division. Apparently, an examination of the chemical properties, chemical structure or physical properties of this particular type of oxyalkylated hydrocarbon, fails to reveal any particular characteristic which can account for such unusual effectiveness as a demulsifier. These materials are sometimes referred to as the di-(polyalkylene glycoxy)alkenes. See U. S. Patent No. 2,240,472, dated August 29, 1941, to Swan. The description of such di-(polyalkylene glycoxy)alkanes appearing in said patent, although brief, is entirely satisfactory; and for such reason, it is adopted in the present instance. Thus, these compounds herein contemplated as demulsifiers, are the di-(polyalkylene glycoxy)alkanes in which the alkenyl radical is selected from the group consisting of the aliphatic alkenyl radicals containing from 8 to 18 carbon atoms and the di-cyclohexenyl dialkyl methanes in which each alkyl radical contains less than 3 carbon atoms, each polyalkylene glycoxy chain contains from 5 to 20 alkylene glycol radicals, and the alkylene radical is selected from the group consisting of ethylene and propylene.

The di(polyalkylene glycoxy)alkanes, in which the alkenyl radical is an aliphatic alkenyl radical of from 8 to 18 carbon atoms, e. g., di-(polyethylene glycoxy)decane, HO.CH₂.CH₂.(O.CH₂.CH₂)$_x$.O.
(CH₂)₁₀.O.(CH₂.CH₂.O)$_x$.CH₂.CH₂.OH may be prepared in a manner similar to that shown in British Patent No. 443,559, by condensing ethylene oxide or propylene oxide with dihydric alcohols of from 8 to 18 carbon atoms, e. g., decamethylene glycol.

The di(polyalkylene glycoxy) alkanes in which the alkenyl radical is a dicyclohexenyl dialkyl methane, e. g., 4:4'-di-(polyethylene glycoxy-cyclohexyl) dimethyl methane

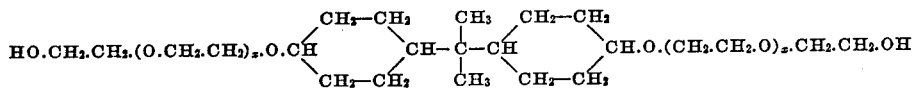

may be prepared as follows: Phenol is reacted with acetone (or diethyl ketone or methyl ethyl ketone), as described in U. S. Patent No. 1,225,748, dated May 15, 1917, to Wallace A. Beatty, to give the compound diphenylol dimethyl methane

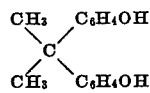

(or the corresponding diethyl or methyl ethyl compound). This compound is hydrogenated, as described in British Patent No. 274,439, to give the corresponding dicyclohexylol dialkyl methane. This is then condensed with ethylene oxide or propylene oxide, in a manner similar to that shown in British Patent No. 443,559. Such compounds are mentioned in French Patent No. 772,302.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible, when the demulsifier is used in connection with acidification of calcareous oil-bearing strata, especially if suspended in or dissolved in the acid employed for acidification.

A somewhat analogous use of my demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

Having thus described my invention, what I claim as new and desire to secure by Letters Patent is:

A process for breaking petroleum emulsions of the water-in-oil type, which consists in subjecting the emulsion to the action of a demulsifying agent comprising a 4:4'-di-(polyethylene glycoxy-cyclohexyl) dimethyl methane.

MELVIN DE GROOTE.